United States Patent
Popovic et al.

(10) Patent No.: US 9,181,876 B2
(45) Date of Patent: Nov. 10, 2015

(54) METHOD AND APPARATUS FOR OPERATING A GAS TURBINE ENGINE

(75) Inventors: Predrag Popovic, Simpsonville, SC (US); William Francis Carnell, Jr., Greer, SC (US); Andrew Mitchell Rodwell, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 914 days.

(21) Appl. No.: 13/343,286

(22) Filed: Jan. 4, 2012

(65) Prior Publication Data

US 2013/0167548 A1  Jul. 4, 2013

(51) Int. Cl.
*F02C 7/16* (2006.01)
*F02C 6/08* (2006.01)
*F02C 7/224* (2006.01)

(52) U.S. Cl.
CPC ... *F02C 7/16* (2013.01); *F02C 6/08* (2013.01); *F02C 7/224* (2013.01)

(58) Field of Classification Search
CPC ............ F02C 6/08; F02C 7/141; F02C 7/143; F02C 7/16; F02C 7/185; F02C 9/18; F02C 7/18; F02C 1/04; F05D 2260/211; F05D 2260/213; F05D 2260/232; F05D 2260/2322; F05D 2260/234
See application file for complete search history.

(56) References Cited

U.S. PATENT DOCUMENTS

| | | | |
|---|---|---|---|
| 3,969,446 A | 7/1976 | Franklin, Jr. | |
| 4,195,485 A | 4/1980 | Brinkerhoff | |
| 4,522,024 A * | 6/1985 | Zaugg | 60/775 |
| 4,745,768 A | 5/1988 | Schorr et al. | |
| 5,203,161 A | 4/1993 | Lehto | |
| 5,479,783 A | 1/1996 | Uchida | |
| 6,457,315 B1 | 10/2002 | Lee et al. | |
| 6,477,852 B2 | 11/2002 | Dodo et al. | |
| 6,604,360 B1 | 8/2003 | Vuk | |
| 6,651,443 B1 | 11/2003 | Meckler | |
| 6,694,772 B2 | 2/2004 | Inoue et al. | |

(Continued)

FOREIGN PATENT DOCUMENTS

| | | |
|---|---|---|
| CN | 1693686 A | 11/2005 |
| CN | 101059101 A | 10/2007 |

OTHER PUBLICATIONS

Unofficial English translation of Chinese Office Action issued in connection with corresponding CN Application No. 201310001590.5 on Jul. 27, 2015.

*Primary Examiner* — Andrew Nguyen
(74) *Attorney, Agent, or Firm* — Dority & Manning, PA

(57) ABSTRACT

A gas turbine includes a compressor, a combustor downstream from the compressor and a heat transfer system, wherein the heat transfer system receives a compressed working fluid from the compressor. A fluid coupling between the heat transfer system and the combustor, wherein the fluid coupling receives the compressed working fluid from the heat transfer system. A conditioner in fluid communication with the compressor and a fluid coupling between the heat transfer system and the conditioner, wherein the fluid coupling receives a cooling media from the heat transfer system. A method for operating the gas turbine includes flowing a compressed working fluid from the compressor to the heat transfer system, transferring heat energy from the compressed working fluid to the heat transfer system, flowing the compressed working fluid from the heat transfer system to a combustor, and flowing a cooling media from the heat transfer system to a compressor inlet.

19 Claims, 2 Drawing Sheets

(56) References Cited

U.S. PATENT DOCUMENTS

| | | |
|---|---|---|
| 6,745,574 B1 | 6/2004 | Dettmer |
| 6,792,762 B1 * | 9/2004 | Yamanaka et al. ............ 60/782 |
| 7,007,484 B2 | 3/2006 | Stegmaier et al. |
| 7,178,348 B2 | 2/2007 | Stuhlmueller |
| 7,472,550 B2 | 1/2009 | Lear, Jr. et al. |
| 7,644,573 B2 | 1/2010 | Smith et al. |
| 7,716,930 B2 * | 5/2010 | Chillar et al. ............ 60/728 |
| 7,717,669 B2 | 5/2010 | Sheath et al. |
| 7,762,054 B2 | 7/2010 | Erickson et al. |
| 7,827,794 B1 | 11/2010 | Pronske et al. |
| 2007/0019708 A1 * | 1/2007 | Shiflett et al. ............ 374/181 |
| 2008/0083841 A1 * | 4/2008 | Bainville et al. ............ 239/419.3 |
| 2010/0170219 A1 | 7/2010 | Venkataraman et al. |
| 2011/0023491 A1 | 2/2011 | Rendo et al. |

* cited by examiner

METHOD AND APPARATUS FOR OPERATING A GAS TURBINE ENGINE

FIELD OF THE INVENTION

The present invention generally relates to a gas turbine and a method for operating the gas turbine.

BACKGROUND OF THE INVENTION

Gas turbine engines are widely used to generate power for numerous applications. A conventional gas turbine engine includes a compressor, a combustor, and a turbine. In a typical gas turbine engine, the compressor provides compressed air to the combustor. The air entering the combustor is mixed with fuel and combusted. Hot gases of combustion are exhausted from the combustor and flow across the blades of the turbine so as to rotate a shaft of the turbine connected to the blades. Some of that mechanical energy of the rotating shaft drives the compressor and/or other mechanical systems.

Temperatures in modern gas turbine combustors may exceed two thousand degrees Fahrenheit. As a result, the mechanical components exposed to these temperatures within the combustor may experience significant thermal stress during operation of the gas turbine, thus significantly reducing the mechanical life of the combustor. In addition, when the gas turbine is operated in an environment in which the ambient temperature of the air entering the compressor is above certain levels, the core engine temperature may rise to an unacceptably high level, thus affecting engine efficiency and possibly decreasing the life of the gas turbine components.

Various methods exist for reducing the temperatures within a gas turbine. For example, one method for controlling the temperature within the combustor of a gas turbine involves passing the air entering the compressor through a chiller at the compressor inlet, thereby decreasing the temperature of the compressed air as it enters the compressor. However, the compressed air temperature provided to the combustor in this manner may not provide sufficient cooling of the mechanical components within the combustor. In addition, this method does not allow for directing the cooled compressed air to the individual components or zones within the combustor. Therefore, an improved gas turbine and a method for operating the gas turbine would be useful.

BRIEF DESCRIPTION OF THE INVENTION

Aspects and advantages of the invention are set forth below in the following description, or may be obvious from the description, or may be learned through practice of the invention.

One embodiment of the present invention is a gas turbine that generally includes a compressor, wherein the compressor includes an inlet and produces a compressed working fluid. A combustor downstream from the compressor and a heat transfer system downstream from the compressor and upstream from the combustor, wherein the heat transfer system receives the compressed working fluid from the compressor. A first fluid coupling between the heat transfer system and the combustor, wherein the first fluid coupling receives the compressed working fluid from the heat transfer system. A conditioner in fluid communication with the inlet, and a second fluid coupling between the heat transfer system and the conditioner, wherein the second fluid coupling receives a cooling media from the heat transfer system.

A second embodiment of the present invention is a gas turbine that generally includes a compressor, wherein the compressor includes an inlet and produces a compressed working fluid. A combustor downstream from the compressor and a means for supplying a cooled compressed working fluid to the combustor and a cooling media to the inlet of the compressor.

Embodiments of the present invention may also include a method for operating a gas turbine that includes flowing a compressed working fluid from a compressor to a heat transfer system, transferring heat energy from the compressed working fluid to the heat transfer system, flowing the compressed working fluid from the heat transfer system to a combustor, and flowing a cooling media from the heat transfer system to an inlet of the compressor.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
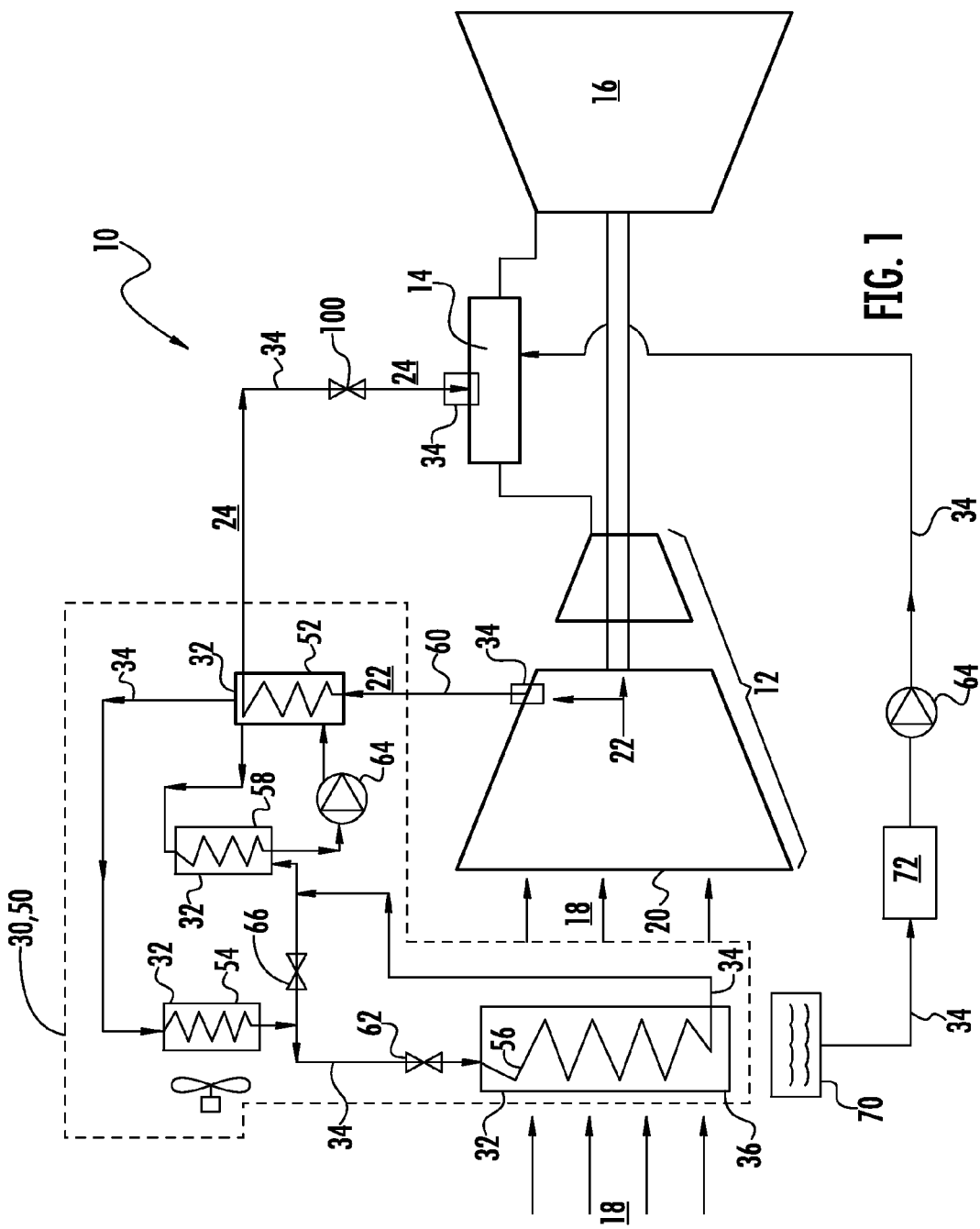
FIG. 1 is a block diagram of an exemplary gas turbine according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a gas turbine and a method for supplying a cooled compressed working fluid and a cooling media to the gas turbine. The gas turbine generally includes a compressor, a heat transfer system, a combustor and a turbine. In particular embodiments, the compressor may be in fluid communication with the heat transfer system and the combustor, thereby allowing at least a portion of a compressed working fluid extracted from the compressor to flow through the heat transfer system, wherein heat energy may be extracted from the compressed working fluid. In this manner the energy extracted by the heat exchanger may cool the compressed working fluid and/or may provide energy to operate the heat transfer system and/or other auxiliary components of the gas turbine, such as a chiller. Although exemplary embodiments of the present invention will be described generally in the context of an industrial gas turbine and a method for operating the industrial gas turbine, for purposes of illustration, one of ordinary skill in the art will readily appreciate that embodiments of the present invention may be applied to any gas turbine and are not limited to the industrial gas turbine unless specifically recited in the claims.

FIG. 1 provides a simplified block diagram of a gas turbine 10 according to one embodiment of the present invention. As shown, the gas turbine 10 may generally include a compressor 12, at least one combustor 14 downstream from the compressor 12, and a turbine 16 downstream from the combustor 14. The compressor 12 may be an axial flow compressor 12 in which a working fluid 18, such as ambient air, enters the compressor 12 through a compressor inlet 20 and passes through alternating stages of stationary vanes and rotating blades that progressively impart kinetic energy to the working fluid 18 to produce a continuous flow of compressed working fluid 22. At least a portion of the compressed working fluid 22 may be extracted from the compressor to support various operations of the gas turbine 10. At least a portion of the remaining compressed working fluid 22 may flow to the combustors 14 where it mixes with fuel and ignites to generate a hot gas with a high pressure. The hot gas flows to the turbine 16 and expands to produce work.

The various embodiments of the present invention include a means for supplying a cooled compressed working fluid 24 to the combustor 14 and a cooling media to the compressor inlet 20. As shown in FIG. 1, the structure for the means may include at least one heat transfer system 30 downstream from the compressor 12 and upstream from the combustor 14. The heat transfer system 30 may include one or more heat exchangers 32 and one or more fluid couplings 34. The one or more heat exchangers 32 may include a shell and tube and/or a refrigeration type heat exchanger 32. However, it should be understood by one of ordinary skill in the art that the one or more heat exchangers 32 may include any type and/or any combination of heat exchangers 32 currently known in the art that transfers heat energy to and/or from a heat transfer media. In particular embodiments, the heat transfer media may include any liquid solution such as Ammonia and Water or any liquid, gas and/or solid media suitable for transferring heat energy within a heat exchanger 32. The one or more fluid couplings 34 may include tubes, pipes, hoses, connectors or any structure of any size and/or shape suitable for flowing the compressed working fluid 22 and/or the heat transfer media. In the alternative or in addition, the means may further include a conditioner 36, for example, a chiller, in fluid communication with the heat transfer system 30 and the compressor inlet 20. The conditioner 36 may be in fluid communication with the heat transfer system 30 through the one or more fluid couplings 34.

As shown in FIG. 1, in particular embodiments within the scope of the present invention, the heat transfer system 30 may include an absorption chiller 50. Generally, an absorption chiller 50 may include a generator 52, a condenser 54, an evaporator 56, an absorber 58 and one or more of the one or more fluid couplings 34. In particular embodiments, the heat transfer media may include a solution of ammonia and water wherein the refrigerant is ammonia. It should be appreciated by one of ordinary skill in the art that the heat transfer media may include any solution commonly used for such applications wherein a refrigerant may be distilled. By way of example only, the following description of the absorption chiller will generally describe the operation of an ammonia/water absorption chiller.

In particular embodiments, one or more feed lines 60 may provide fluid communication between the compressor 12 and the generator 52. The one or more feed lines 60 may include tubes, pipes, hoses, connectors or any structure of any size and/or shape suitable for flowing the compressed working fluid 22. In this manner, the compressed working fluid 22 flows from the compressor 12 and through the generator 52 wherein heat energy may be transferred from the compressed working fluid 22 to the ammonia/water heat transfer media, thus allowing at least a portion of the refrigerant to distill from the heat transfer media as a heated vaporized refrigerant and the remaining ammonia/water solution to be recirculated through the absorber 58. In this manner, the heat transfer cycle may be initiated within the absorption chiller 50, thus providing a cooled compressed working fluid 24. The generator 52 may be in fluid communication with the combustor 14 through a first of the one or more fluid couplings 34. In this manner, the cooled compressed working fluid 24 may flow into the combustor 14. As a result, the cooled compressed working fluid 24 may enhance premixing of the compressed working fluid 24 and the fuel and/or may reduce thermal stresses within the combustor 14. In addition or alternatively, at least one of the one or more fluid couplings 34 providing fluid communication between the heat transfer system 30 and the combustor 14, may include a flow regulator 100. In this manner, the flow of the cooled compressed working fluid 24 entering the combustor 14 may be adjusted to accommodate the operating conditions of the combustor 14 and/or the gas turbine 10.

The heated vaporized refrigerant may flow from the generator 52, through one or more of the one or more fluid conduits 34 and into the condenser 54 where it is cooled and transformed into a high pressure liquid refrigerant. The heat from the condenser 54 is dissipated via ambient air, though other cooling media may be used. In particular embodiments, one or more fans may be used to provide a cooling flow across the condenser to enhance condenser performance. The high pressure liquid refrigerant flows from the condenser 54, through one or more of the one or more fluid couplings 34 and through an expansion valve 62, for example, a thermostatic expansion valve, to produce a low pressure liquid or 2-phase refrigerant. The low pressure liquid or 2-phase refrigerant flows through one or more of the one or more fluid couplings 34 and to the evaporator 56. The low pressure refrigerant boils in the evaporator 56, thus providing a cooling or refrigeration effect. In certain embodiments, the evaporator 56 may be in fluid communication with the conditioner 36 through one or more of the one or more fluid couplings 34. As a result, the evaporator 56 may provide a cooling media to the conditioner 36. In this manner, the temperature of the working fluid 18 flowing through the conditioner 36 and into the compressor inlet 20 may be decreased, thus improving the overall efficiency of the gas turbine.

The low pressure refrigerant converts into a high temperature low pressure refrigerant vapor as it boils in the evaporator 56. The low pressure refrigerant vapor flows to the absorber 58 through one or more of the one or more fluid couplings 34 and mixes into the ammonia/water solution recirculated from the generator 52, thus reproducing the original concentrations of the ammonia/water liquid solution mixture. The absorber 58 transfers heat energy away from the liquid solution by dissipating it to the ambient air or to any other available cooling media. In particular embodiments, one or more fans may be utilized to enhance the cooling efficiency of the absorber. For example, a single fan may be used to cool the condenser and the absorber. In other embodiments, the absorber may have a dedicated fan for cooling. The liquid solution is pumped back to the generator 52 through one or more fluid pumps 64, to repeat the heat transfer cycle. In particular embodiments, one or more of the fluid couplings 34, including at least one bypass valve 66 may provide fluid communication between the condenser and the absorber. In this manner, the evaporator may be at least partially or fully bypassed in order to provide cooling capacity control to the absorption chiller 50. It should be appreciated by one of ordinary skill in the art that the aforementioned description of the operation of the absorption chiller and the components of the absorption chiller is intended to be a brief and general depiction of the absorption chiller heat transfer cycle and its components, and is not meant to be limiting in any way.

In addition or in the alternative, the gas turbine may include a condensate reservoir 70 in fluid communication with the conditioner 36 and/or the evaporator 56 and/or the combustor 14. In this manner, the condensate reservoir 70 may collect water condensing from the working fluid 18 flowing across the conditioner 36 and/or the evaporator 56. The water may flow from the condensate reservoir 70 to a filter 72 in fluid communication with the condensate reservoir 70 and may be pumped from the filter 72 into the combustor 14 through one or more of the one or more fluid pumps 64 and/or one or more of the one or more fluid couplings 34. As a result, the water may be injected into the combustor 14 to enhance mixing of the compressed working fluid 18 and the fuel, to control NOx emissions and/or to provide cooling to the combustor 14.

Figure 2:
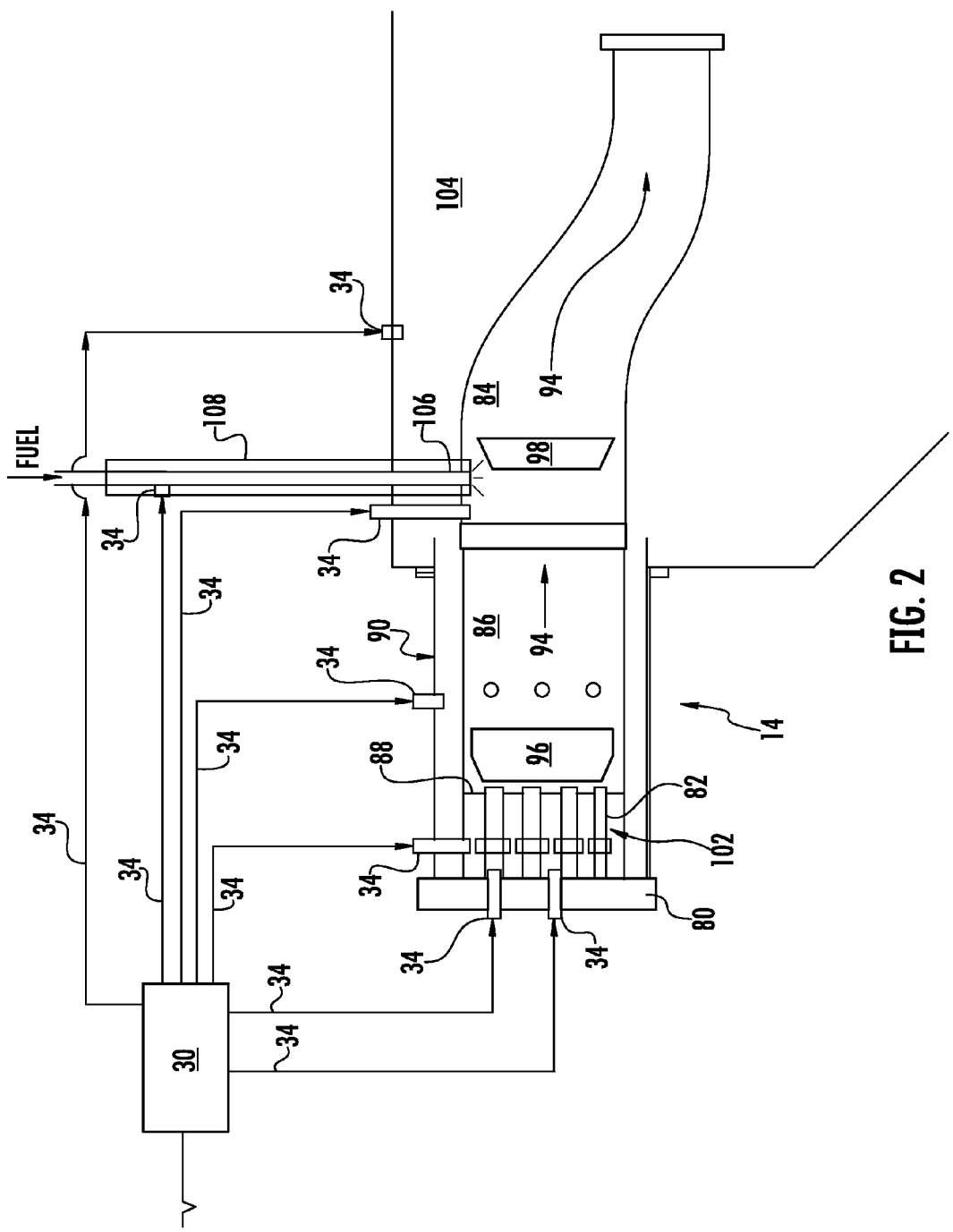
FIG. 2 is a cross section of an exemplary combustor as shown in FIG. 1.

FIG. 2 provides a cross section of an exemplary combustor 14 as shown in FIG. 1. As shown in FIG. 2, the combustor 14 may include an end cover 80, one or more fuel nozzles 82, a transition piece 84, a combustion liner 86, an end cap 88 and/or a casing 90 that at least partially surrounds the combustor 14. The transition piece 84 and/or the combustion liner 86 may provide an at least partially annular passage extending axially through the casing 90. As a result, the at least partially annular passage and the casing 90 may define a combustion chamber and/or one or more flow paths for the compressed working fluid 22 and/or the hot gas to flow within the combustor 14. The combustor 14 may include a first combustion zone 96 and/or a second combustion zone 98 axially downstream from the first combustion zone 96. The combustor 14 may include one or more of the one or more of the fluid couplings 34 providing fluid communication between the heat transfer system 30 and the combustor 14. In this manner, the cooled compressed working fluid 24 may flow from the heat transfer system 30 to the combustor 14.

In particular embodiments, the cooled compressed working fluid 24 may flow from the heat transfer system 30, through one or more of the one or more fluid couplings 34 and into the end cover 80, providing lower cooling temperature thus reducing thermal stresses within the end cover 80. In alternate embodiments, one or more of the one or more fluid couplings 34 may direct the cooled compressed working fluid 24 through the casing 90 and into a premixing zone 102 generally upstream of the first combustion zone 96. As a result, the cooled working fluid 24 may reduce the temperature of the hot gas, thus enhancing the premixer capabilities by increasing resistance to flashback and increasing auto ignition delay time of the compressed working fluid 22 and the fuel. In addition, the cooled compressed working fluid 24 flowing to the premixing zone 102 may significantly increase performance of the combustor 14 and combustor 14 life by reducing the risk of flashback as well as auto-ignition within the combustor 14.

In further embodiments, one or more of the one or more fluid couplings 34 may direct the cooled compressed working fluid 24 through the combustion liner 86 and/or through the transition piece 84 and into the hot gas path 94 of the combustor 14 downstream of the first combustion zone 96 and upstream of the second combustion zone 98. In this manner, the cooled compressed working fluid 24 may reduce the temperature of the hot gas as it exits the first combustion zone 96, thus reducing the temperature within the combustor 14. In addition, the introduction of the cooled compressed working fluid 24 upstream from the second combustion zone 98 may enhance premixing of the fuel and the compressed working fluid 22 in the second combustion zone 98. In other embodiments, one or more of the one or more fluid couplings 34 may direct at least a portion of the cooled compressed working fluid 24 into a plenum 104 at least partially surrounding the combustor 14, thus enhancing cooling within the combustor 14. In alternate embodiments, one or more of the one or more fluid couplings 34 providing fluid communication between the heat transfer system 30 and the combustor 14 may provide at least a portion of the cooled compressed working fluid 24 to a fuel supply conduit 106 in fluid communication with the combustor 14. In this manner, the cooled working fluid 24 may be used to provide a film surrounding the fuel, thus not allowing the fuel to be heated prior to combustion, thereby reducing the potential for coking or auto-ignition in the fuel lines of the fuel within the combustor 14.

The various embodiments shown and described with respect to FIGS. 1-2 may also provide a method for operating the gas turbine 10. The method generally includes flowing the compressed working fluid 22 from the compressor 12 to the heat transfer system 30, transferring heat energy from the compressed working fluid 22 to the heat transfer system 30, flowing the compressed working fluid 22 from the heat transfer system 30 to the combustor 14, and flowing a cooling media from the heat transfer system 30 to the inlet 20 of the compressor. The method may also include flowing the working fluid 18 through the conditioner 36 and into the compressor 12. In particular embodiments, wherein the heat transfer system 30 includes the absorption chiller 50 in fluid communication with the compressor 12, the method may include transferring the heat energy from the compressed working fluid 22 to the heat transfer media flowing within the absorption chiller 50 to cool the compressed working fluid 22 and to initiate the heat transfer cycle of the absorption chiller 50. The method may further include flowing at least a portion of the compressed working fluid 22 through one or more of the one or more fluid couplings 34 from the heat transfer system 30 and into at least one of the end cover 80, the first premixing zone 102, the first combustion zone 96, the second combustion zone 98, the hot gas path 94 or one or more fuel nozzles 82 within the combustor 14. In alternate embodiments, the method may include mixing at least a portion of the compressed working fluid 22 with a fuel in a fuel supply conduit 106 in fluid communication with the one or more fluid couplings 34 and the combustor 14, and flowing the mixture into the combustor 14. The method may further include flowing at least a portion of the compressed working fluid 22 from the heat transfer system 30 through one or more of the fluid couplings 34, into a sleeve 108 surrounding the fuel conduit 106 and into the combustor 14. In addition or in the alternative, the method may further include collecting condensate from the working fluid 18 flowing through the conditioner 36 and flowing the condensate to the combustor 14.

The various embodiments shown and described with respect to FIGS. 1-2 provide one or more commercial and/or technical advantages over previous gas turbines and methods for operating gas turbines. For example, the mechanical life of the combustor may be improved by flowing the hot compressed working fluid from the compressor, through the heat transfer system and into the combustor, thereby reducing the thermal stresses within the combustor and/or the potential for flame holding or flashback within the combustor. As a result, operators may extend the period between outages for repairs, thereby reducing the cost to operate and maintain the gas turbine. In addition, by providing a cooling media to the compressor inlet to cool the working fluid entering the compressor, the gas turbine may be operated at higher efficiencies, thus saving fuel and improving energy output.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine, comprising:
   a compressor having an inlet defined at an upstream end of the compressor, an extraction port defined downstream from the inlet and a combustor disposed downstream from an outlet of the compressor; and
   an absorption chiller, the absorption chiller comprising:
   an absorber including a heat transfer media comprising a refrigerant and fluid mixture:
   a generator in fluid communication with the absorber and in thermal communication with the extraction port of the compressor, wherein the generator transfers thermal energy from a compressed working fluid provided by the compressor to the heat transfer media, wherein the generator distills at least a portion of the refrigerant from the heat transfer media and provides a heated-vaporized portion of refrigerant to a first outlet of the generator and a remaining portion of refrigerant to a second outlet of the generator; and
   a conditioner disposed upstream from the inlet of the compressor and upstream from the extraction port, wherein the conditioner is in fluid communication with the first outlet of the generator and in fluid communication with an inlet of the absorber.

2. The gas turbine as in claim 1, wherein the refrigerant is ammonia.

3. The gas turbine as in claim 1, wherein the absorption chiller further comprises a condenser disposed downstream from the first outlet of the generator and upstream from an inlet of the conditioner.

4. The gas turbine as in claim 1, further comprising a plurality of fluid couplings that define a flow path that extends from the compressor, through the generator and directly to the combustor.

5. The gas turbine as in claim 4, wherein one or more fluid couplings of the plurality of fluid couplings connect the compressor to a fuel nozzle disposed within the combustor.

6. The gas turbine as in claim 4, wherein one or more fluid couplings of the plurality of fluid couplings connect the compressor to a fuel nozzle disposed downstream from a first combustion zone defined within the combustor and upstream from a second combustion zone defined within the combustor.

7. The gas turbine as in claim 4, wherein one or more fluid couplings of the plurality of fluid couplings provides for fluid communication between the compressor, through the generator and into a hot gas path defined within the combustor.

8. The gas turbine of claim 1, further comprising a condensate reservoir in fluid communication with the conditioner and with the combustor, wherein the condensate reservoir collects condensate from ambient air flowing through the conditioner and into the inlet of the compressor.

9. Method for operating a gas turbine, comprising:
   flowing a heated compressed working fluid from a compressor of the gas turbine through a generator of an absorption chiller;
   transferring thermal energy from the heated compressed working fluid to a heat transfer media flowing between an absorber of the absorption chiller and the generator, wherein the heat transfer media comprises a refrigerant and fluid;
   distilling a portion of the refrigerant from the heat transfer media via the generator to produce a vaporized portion and a remaining portion;
   flowing the vaporized portion of the refrigerant through a conditioner disposed downstream from the generator and upstream from an inlet to the compressor;
   flowing the remaining portion from the generator to the absorber;
   flowing the vaporized portion of the refrigerant from the conditioner to the absorber; and
   mixing the vaporized portion of the refrigerant with the refrigerant and fluid heat transfer media disposed within the absorber.

10. The method as in claim 9, further comprising condensing the vaporized portion of the refrigerant via a condenser disposed downstream from the generator and upstream from the conditioner.

11. The method as in claim 9, further comprising flowing the vaporized portion of the refrigerant through a thermostatic valve downstream from the generator and upstream from the conditioner to provide a 2-phase refrigerant and flowing the 2-phase refrigerant to an evaporator of the conditioner.

12. The method as in claim 9, further comprising flowing ambient air through the conditioner and into the inlet of the compressor, wherein flowing the vaporized portion of the refrigerant through the conditioner cools the ambient air upstream from the inlet.

13. The method as in claim 9, further comprising flowing ambient air through an evaporator of the conditioner and into the inlet of the compressor and collecting moisture from the evaporator via a condensate reservoir.

14. The method as in claim 13, further comprising injecting at least a portion of the water collected in the condensate reservoir into the combustor.

15. The method as in claim 9, wherein transferring thermal energy from the heated compressed working fluid to the heat transfer media provides a cooled compressed working fluid downstream from the generator, the method further comprising flowing the cooled compressed working fluid to a combustor of the gas turbine.

16. The method as in claim 15, further comprising flowing at least a portion of the cooled compressed working fluid into an end cover of the combustor.

17. The method as in claim 15, further comprising flowing at least a portion of the compressed working fluid into a premixing zone defined within the combustor.

18. The method as in claim 15, further comprising flowing at least a portion of the cooled compressed working fluid into one or more fuel nozzles in the combustor.

19. The method as in claim 15, wherein the fluid comprises water.

* * * * *